3,391,338
TACHOMETER SYSTEM WITH CYLINDER
SWITCH COUPLED TO RANGE SWITCH
Russell M. Jornd, Dixon, Ill., assignor to Borg-Warner
Corporation, Chicago, Ill., a corporation of Illinois
Continuation-in-part of application Ser. No. 396,835,
Sept. 16, 1964. This application Oct. 11, 1967, Ser.
No. 674,456
8 Claims. (Cl. 324—70)

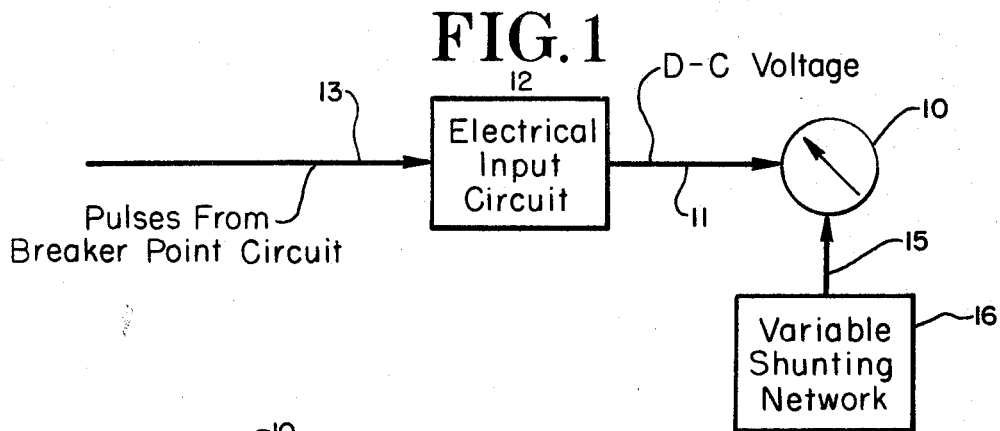
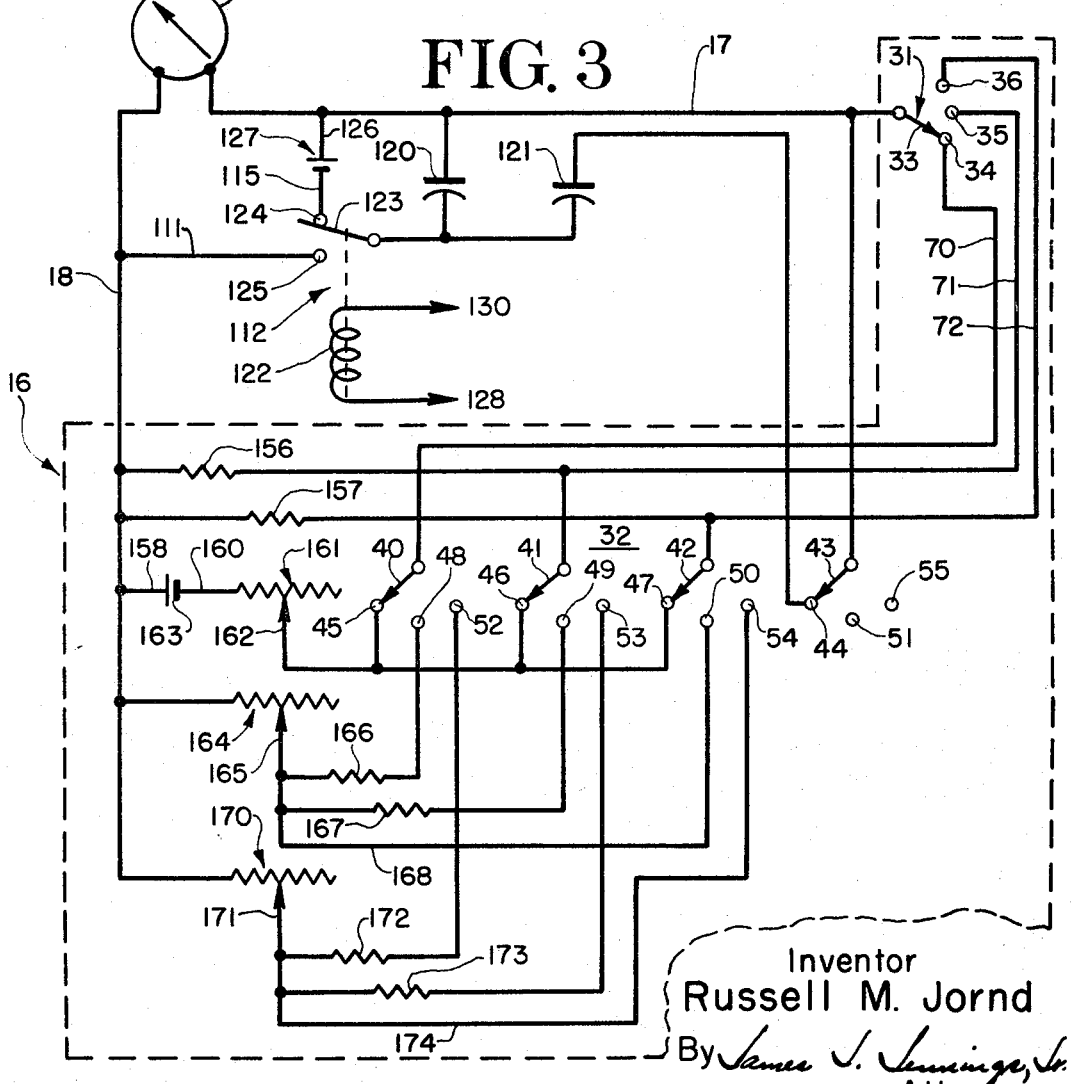

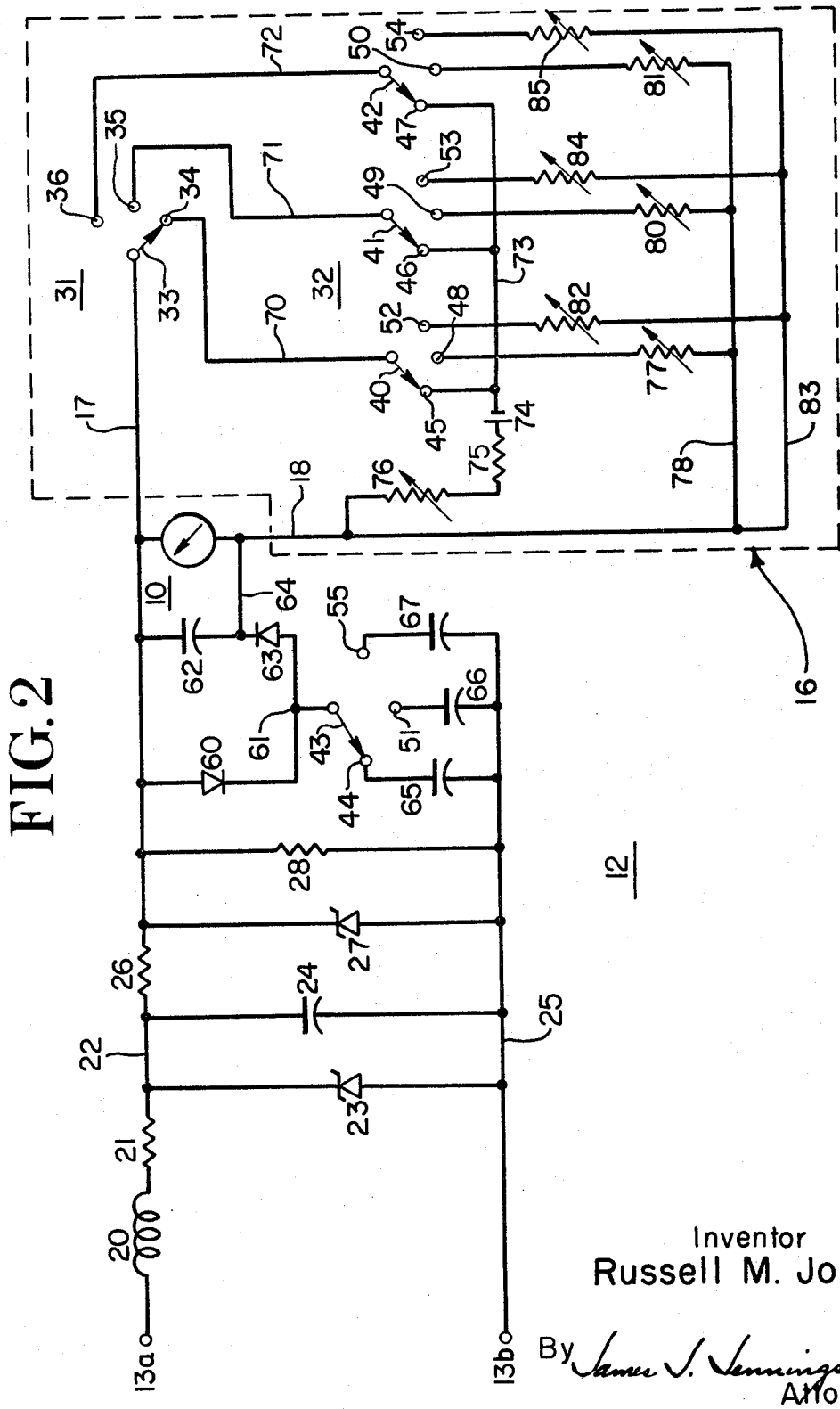

ABSTRACT OF THE DISCLOSURE

An electrical input circuit is coupled between a meter and the distributor breaker point circuit of an engine. The input circuit can be a unidirectional circuit to provide a D-C voltage without employing a separate battery, or the input circuit can include a switching arrangement for periodically charging a capacitor from a separate battery as a relay is actuated by the distributor pulses. The voltage provided by the electrical input circuit is passed through a cylinder selection switch to a series-coupled range switch, which is a multiganged switch for selecting low, high and expanded scale readings. A battery is included in the expanded scale circuit to produce a large meter deflection for a small speed variation when the expanded scale is selected.

BACKGROUND OF THE INVENTION

This application is a continuation-in-part of an earlier application in the same name, originally entitled "Speed Indicating System," Ser. No. 396,835, filed Sept. 16, 1964, now abandoned, and assigned to the same assignee.

The present invention is directed to a speed indicating system especially useful in conjunction with an internal combustion engine, and more particularly to such a system which includes an electrical meter associated with a novel shunting network which affords accurate indication over different speed ranges for engines with different numbers of cylinders.

In the past electrical tachometer systems have been utilized to provide a speed indication for an internal combustion engine. Conventionally an electrical meter, such as a milliammeter, has one side coupled both to an energy storage means and to an energy input circuit, to which a battery or other source of electrical energy may be coupled. Some switching means, such as a relay or semiconductor unit, is provided and operated by a signal derived from the distributor points to operate the switching means at a rate which is a function of the engine speed. The relay contacts or the semiconductor terminals can be connected to complete the circuit from the energy storage means first to the energy input circuit and then to the meter. Thus the energy storage means, which may be a capacitor, is alternatively charged from the input circuit and discharged through the meter to provide the speed indication.

There are various shortcomings in known speed indicating systems, especially in the lack of a system to accurately provide a speed indication for engines with different numbers of cylinders, and to provide such an indication over wide speed ranges. It is therefore a primary consideration of this invention to provide a novel and unobvious tachometer type speed indicating system for use with engines with different numbers of cylinders, and provide accurate indication of the engine operating speed over a wide range. Another salient consideration is the provision of an accurate tachometer system without employing switching means, whether a relay, semiconductor unit or other arrangement, for periodic operation as a function of the breaker point pulses.

In one embodiment the present invention includes an electrical meter coupled through an electrical input circuit to the breaker point circuit, to provide across the meter a D-C voltage which is a function of the rate of operation of the breaker point circuit. In a preferred embodiment the electrical input circuit comprises passive components which produce the desired D-C voltage of a given polarity for actuating the meter. In another embodiment a relay has its winding coupled to the breaker point circuit and, in one position of the relay contacts a capacitor is charged from a battery with a polarity switch such that, in the other position of the relay contacts, the charge accumulated in the capacitor is passed through the meter to provide the desired speed indication.

In accordance with the present invention, a novel and unobvious variable shunting network is coupled in parallel with the meter. This network includes a first switching arrangement for selecting the range of impedance values to be placed in parallel with the meter as a function of the number of cylinders in the engine having its speed monitored, and a second switching means is coupled in series with the first switching arrangement to select a desired one of the impedance values within the selected range of values. Selection of this particular range of impedance values provides accurate operation of the system over low and high speed ranges, and even over an expanded scale arrangement in which a large deflection of the pointer on the meter is produced responsive to a small variation in engine speed.

THE DRAWINGS

The best mode contemplated for making and using the invention will be described in connection with the accompanying drawings, in which like reference numerals identify like elements, and in which:

FIGURE 1 is a block diagram of the inventive arrangement;

FIGURE 2 is a schematic diagram depicting circuit details of a preferred embodiment of the invention; and FIGURE 3 is a schematic diagram illustrating another embodiment of the invention.

GENERAL DESCRIPTION

FIGURE 1 indicates an electrical meter 10 coupled over line 11 to an electrical input circuit 12. Pulses from the breaker point circuit are applied over line 13 to the electrical input circuit, wherein the pulses are rectified to produce a substantially constant D-C voltage for application over line 11 to the meter. In accordance with the present invention a variable shunting network 16 is coupled over line 15 to the meter. The details of the electrical input circuit and the variable shunting network will be explained in conjunction with FIGURES 2 and 3.

First embodiment, FIGURE 2

The pulses received from the breaker point circuit are applied to terminals 13a and 13b in FIGURE 2. These terminals correspond to the conductor 13 in FIGURE 1. An inductance 20 and a resistor 21 are coupled in series between input terminal 13a and conductor 22. A first Zener diode 23 is coupled in parallel with a capacitor 24, and these two components are coupled between conductors 22 and 25. A second resistor 26 is coupled between conductors 22 and 17, and a second Zener diode 27 is coupled between conductors 17 and 25. Another resistor 28 is coupled in parallel with diode 27.

A diode 60 is coupled between conductor 17 and a reference terminal 61. A capacitor 62 is coupled in series with another diode 63, and this series circuit is itself coupled in parallel with diode 60. Meter 10 is coupled between common conductors 17 and 18, and a connection from conductor 18 is extended over conductor 64 to the common connection between capacitor 62 and diode 63.

Movable contact 43 is connected to reference terminal 61, and contact 43 is displaceable to engage one of the fixed contacts 44, 51 and 55 in the same contact set. This contact set is a part of the range selection switch 32 and thus (although not indicated on the drawing for the sake of clarity) movable contact 43 is displaced concomitantly with actuation of movable contacts 40, 41 and 42. Three different capacitors 65, 66 and 67 are respectively coupled between common conductor 25 and fixed contacts 44, 51 and 55.

A first selector switch 31 has a movable contact 33 coupled to reference conductor 17, and contact 33 is displaceable to engage one of the fixed contacts 34, 35 and 36 in the same contact set. In accordance with the present invention, contact 34 is coupled over conductor 70 to movable contact 40 of range selector switch 32; fixed contact 35 of the cylinder selection switch is coupled over conductor 71 to movable contact 41 of switch 32; and fixed contact 36 of the first switch 31 is coupled over conductor 72 to the movable contact 42 of second selector switch 32. Thus the cylinder selection switch is electrically coupled in series with the range selector switch so that actuation of movable contact 33 selects a particular movable contact in one contact set of the second selector switch, which in turn is displaceable to select one range of a plurality of impedance value ranges corresponding to different scale settings on electrical meter 10.

Fixed contacts 45, 46 and 47 of range selector switch 32 are all coupled to conductor 73. A battery 74, resistor 75 and a potentiometer 76 are all coupled in series between conductors 73 and 18. Fixed contact 48 is coupled through a potentiometer 77 to conductor 78, which is coupled to reference conductor 18; contact 49 is coupled over another variable resistor 80 to conductor 78, and contact 50 is coupled through potentiometer 81 to conductor 78. Fixed contact 52 is coupled through a potentiometer 82 to conductor 83, which is coupled to reference conductor 18; contact 53 is coupled through a variable resistor 84 to conductor 83, and contact 54 is coupled through a potentiometer 85 to conductor 83.

In operation movable contact 33 is first displaced to engage one of the fixed contacts 34, 35 and 36, thus selecting a circuit arrangement corresponding to the number of cylinders in the engine under test. Switch 31 is shown in the 4-cylinder position, and the other fixed terminals 35 and 36 correspond to the 6-cylinder and 8-cylinder positions, respectively. Scale selection switch 32 is then actuated to displace movable contacts 40–43 simultaneously and thus select either the expanded, high or low scale setting of the instrument. The circuit is shown in the expanded-scale setting. Movable contacts 40–43 when contacting fixed contacts 48–51 provide the high scale circuit, and when contacts 40–43 engage fixed contacts 52–55, the circuit is in the low-scale position. The amount of capacitance provided between diode 60 and conductor 25 is different for each scale setting, thus varying the amount of electrical charge which is accumulated as the breaker point pulses are received at terminals 13a, 13b, and correspondingly varying the discharge from the capacitor in the circuit through diode 63 and meter 10 to indicate the motor speed. Capacitor 62 serves to minimize fluctuations of the pointer in meter 10.

Assuming the circuit is operating in the position shown, and some certain deflection of the meter is achieved, the setting of potentiometer 76 can be varied to provide a discharge current from battery 74 over contacts 45, 40, conductor 70, contacts 34, 33, conductor 17, meter 10, conductor 18, potentiometer 76, and resistor 75 to the other side of battery 74. By "bucking" or opposing the discharge current from capacitor 65 the meter gives a large physical displacement of the indicator for a small increment of speed variation to provide a more accurate metering of the engine under test.

When switch 32 is displaced to another position, say the high scale position, then capacitor 66 is placed in the circuit through diode 63 and meter 10. The shunting circuit then extends from the meter over conductor 17, contacts 33, 34, conductor 70, contacts 40, 48, potentiometer 77, and conductors 78, 18 to the other side of meter 10. Other settings and correspondingly similar operation of the circuit will be understood from the foregoing description. In addition a table of circuit values found operable in the schematic arrangement of FIGURE 2 is set out at the end of the specification.

Second embodiment, FIGURE 3

Another arrangement of the speed indicating system, shown in FIGURE 3, includes a variation of the electrical input circuit and a modification of the different impedance connections of the scale selection switch 32. As there shown, one side of the meter 10 is coupled to conductor 17 and the other side of the meter is coupled to conductors 18 and 111. In this embodiment the electrical input circuit includes a pair of capacitors 120 and 121. A relay 112 has a winding 122, a movable contact 123 and a pair of fixed contacts 124 and 125. The electrical input circuit further includes a battery 127 coupled between conductors 115 and 126. The battery is not discharged unduly in the indicated position of the relay, for capacitors 120 and 121 are paper type capacitors, and the leakage current is of the order of microamperes. It will be apparent to those skilled in the art that other appropriate arrangements, such as an alternating current supply and a rectifier circuit, could be utilized to apply an appropriate energizing potential between conductors 115 and 126. Conductors 128 and 130, between which relay coil 122 is connected, may be coupled to the distributor point circuit to provide for sequential energization of relay 112 as a function of distributor movement, which in turn depends on engine speed.

Variable shunting network 16 includes a first switching arrangement 31 and second switching arrangement 32, connected in series as explained in connection with FIGURE 2. In the showing of FIGURE 3 a first impedance means 156, shown as a simple resistor, is coupled between conductors 18 and 71. Another impedance means 157 is coupled between conductors 18 and 72. Between conductor 18 and contacts 45–47 (the expanded scale terminals of switch 32) is coupled a series circuit including an energy input circuit 158, 160 and a potentiometer 161 which includes an adjustable arm or contact 162. A battery 163 is indicated between the conductors of energy input circuit 158, 160, and the battery is depicted with a polarity such as to "buck" or oppose the energy flow from battery 127, when both batteries are in the circuit at the same time.

Coupled between conductor 18 and the high-scale contacts 48–50 is another circuit including a potentiometer 164 having a movable arm 165, a first impedance means 166 coupled between arm 165 and contact 48, a second impedance means or resistor 167 coupled between arm 165 and contact 49, and the arm or movable contact 165 is coupled directly over conductor 168 to contact 50.

A similar arrangement is provided for low-scale contacts 52–54, with one side of potentiometer 170 being coupled to conductor 18. Movable arm 171 of potentiometer 170 is coupled over a first impedance means 172 to contact 52, over a second impedance means 173 to contact 53, and is coupled directly over conductor 174 to terminal or contact 54.

With conductors 128 and 130 coupled to the breaker point circuit of the distributor, a reverse kick-back voltage in the range of from 20 to about 200 volts is provided across the points with each ignition pulse, and the magnitude of this voltage is ample to energize winding 122 and operate relay 112. Before the relay is actuated, movable contact 123 engages contact 124 and provides an obvious charging path for capacitor 120, and also for capacitor 121 when switch 32 is in the expanded-scale position as indicated. Considering current flow as passing from the positive terminal of the battery through the external circuit and back to the negative terminal, such current flows from battery 127 over conductors 126, 17, the parallel combination of capacitors 120 and 121, contacts 123, 124, and conductor 115 back to battery 127. Accordingly during the time period that relay 112 is not energized, capacitors 120, 121 are charged toward the voltage level of battery 127.

As the reverse kick-back voltage is applied to winding 122, relay 112 is energized and movable contact 123 engages contact 125. Accordingly the capacitor combination 120, 121 commences to discharge over conductor 17, the internal resistance of meter 10, conductors 18 and 111, and contacts 125, 123 back to capacitors 120, 121. The extent of the angular displacement of the indicator needle on meter 10 is a function of the internal meter resistance, the "size" or electrical capacity of the capacitors then in the discharge circuit, the rate at which relay 112 is energized and deenergized, and the value of impedance or resistance coupled in shunt with meter 10. The physical size of the capacitor and of the meter resistance being constant (although the capacitor size is changed in different scale positions), the meter deflection is then a function only of the rate of operation of relay 12, after switches 31 and 32 in variable shunting network 16 have been positioned for the appropriate number of cylinders and the desired scale presentation on the meter.

In the illustrated circuit diagram, switch 31 is in the 4-cylinder position and switch 32 is in the expanded scale position. Accordingly, after relay 112 is energized, capacitors 120, 121 commence to discharge not only through the meter but also the variable shunting circuit within network 16. This circuit extends from the meter over conductors 17, contacts 33, 34, conductor 70, contacts 40, 45, movable arm 162, the effective portion of potentiometer 161, conductor 160, battery 163, and conductors 158, 18 back to the meter. Thus with potentiometer 161 adjusted to accommodate production variations of the internal meter resistance and battery 163 being approximately equal to the voltage of battery 127, a large needle deflection on the meter is provided for a small speed change of the engine.

With switch 31 in the 8-cylinder position (contact 33 engaging contact 36) and switch 32 in the high scale position (contacts 40–43 engaging contacts 48–51), the circuitry of the invention would provide a scale reading over a range of, by way of example, from 0 to 5000 revolutions per minute. By providing switch 32, the expanded scale can be used at the higher speeds and thus a much more accurate indication of the speed variation at such speeds is obtained. Switch 31 adapts the novel tachometer circuit for use with engines having different numbers of cylinders. Accordingly the various cylinder arrangements and meter scale presentations are provided in a compact and inexpensive arrangement, without the requirement of complicated switching networks and power supply circuitry previously utilized in this art.

For additional stabilization of meter indication, mechanical suppression of the meter movement can be provided or a capacitor, such as capacitor 62 in FIGURE 2, can be coupled in parallel with the meter to dampen the needle action.

To assist others in making and using the invention, a table of values for the various components utilized in the circuits of FIGURES 2 and 3 are set out below. It is emphasized, however, that this information is by way of illustration and assistance only and in no sense by way of limitation.

FIGURE 2

| | |
|---|---|
| Meter 10 | 50 microampere movement. |
| Battery 74 | 1.5 volts D.C. |
| Inductor 20 | 100 millihenries, 68 ohms. |
| Capacitor 24 | 47 microfarads, 100 volts D.C. |
| Capacitor 62 | 50 microfarads, 25 volts D.C. |
| Capacitor 65 | 1.5 microfarads, 100 volts D.C. |
| Capacitor 66 | 0.22 microfarad, 100 volts D.C. |
| Capacitor 67 | 2.0 microfarads, 100 volts D.C. |
| Potentiometers 77, 80, 81, 82, 84, 85 | 1000 ohms. |
| Potentiometer 76 | 2000 ohms. |
| Resistor 21 | 220 ohms, ½ watt. |
| Resistor 26 | 1000 ohms, ½ watt. |
| Resistors 28, 75 | 1500 ohms, ½ watt. |
| Diode 23 | 1N961A. |
| Diode 27 | 1N957A. |
| Diodes 60, 63 | 10D1. |

FIGURE 3

| | |
|---|---|
| Meter 10 | 50 microampere movement. |
| Battery 27 | 1.5 volts D.C. |
| Battery 63 | 1.5 volts D.C. |
| Capacitor 20 | 5 microfarads. |
| Capacitor 21 | 5 microfarads. |
| Potentiometer 61 | 0–1500 ohms. |
| Potentiometer 64 | 0–75 ohms. |
| Potentiometer 70 | 0–750 ohms. |
| Resistor 56 | 3600 ohms. |
| Resistor 57 | 1200 ohms. |
| Resistor 66 | 47 ohms. |
| Resistor 67 | 16.9 ohms. |
| Resistor 72 | 453 ohms. |
| Resistor 73 | 178 ohms. |

The present invention provides a tachometer arrangement which is both extremely compact and highly versatile as contrasted to prior art devices. Engine performance over a wide speed range, for example, from 0 to 5000 revolutions per minute can be read by utilizing the high scale position of switch 32. With ordinary tachometers indicating the speed at the high end of such a scale, it would not be possible to check engine operation at such speeds. However, by use of the present invention, the expanded scale can be utilized to indicate small changes in revolutions per minute at a predetermined operating speed. Thus, after the engine is run up to its normal operating speeed, the high voltage for each spark plug circuit can be shorted to ground, and the engine speed should decrease by the same value each time one of these circuits is shorted. Accordingly the efficiency of the ignition high voltage cables, of the spark plugs themselves, and the compression ratio of the engine can be quickly and accurately checked.

Although only particular embodiments of the invention have been described and illustrated, it is apparent that modifications and alterations may be made therein. It is therefore the intention in the appended claims to cover all such modifications and alterations as may fall within the true spirit and scope of the invention.

What is claimed is:

1. In a speed indicating system for an engine under test which includes a plurality of cylinders and a distributor having a breaker point circuit, the combination of
   an electrical meter having a pair of terminals,
   an electrical input circuit coupled between the meter and the breaker point circuit to apply across the meter a D-C voltage which is a function of the rate of operation of the breaker point circuit, and
   a variable shunting network, coupled in parallel with said meter, including a first switch having a movable contact coupled to one terminal of the electrical meter and having a preassigned number of fixed contacts, each fixed contact representing one circuit of a plurality of electrical circuits related to the number of cylinders in an engine, and a second switch including a plurality of mutually insulated moveable contacts each respectively coupled to one of the fixed contacts in the first switch, a plurality of fixed contact sets in the second switch, each set of fixed contacts being positioned for engagement by one of the movable contacts in the second switch, each fixed contact set representing a different meter scale setting, a plurality of variable impedance circuits each having an input connection and an output connection, means individually coupling the input connection of each variable impedance circuit respectively to one fixed contact in each of the fixed contact sets in the second switch, and means coupling the other terminal of the electrical meter to the output connection of each of the variable impedance circuits.

2. A speed indicating system as claimed in claim 1 in which said input circuit comprises a pair of terminals for coupling to the breaker point circuit, a Zener diode coupled in parallel with said terminals, a series circuit including a first diode and a capacitor coupled in parallel with said Zener diode, and a second diode coupled between said electrical meter and the common connection between said first diode and the capacitor, such that the charge accumulated in said capacitor upon receipt of the pulses from the breaker point circuit is gradually discharged through said second diode and the meter to provide an indication of the engine speed.

3. A speed indicating system as claimed in claim 1 in which said electrical input circuit comprises a pair of input terminals for coupling to said breaker point circuit, a relay including a winding coupled to said input terminals and further comprising a movable contact and a pair of fixed contacts for selective engagement by said movable contact, a battery coupled between a first reference conductor and one of said fixed relay contacts, a capacitor coupled between said one reference conductor and said movable relay contact, means electrically coupling a second reference conductor to the other of said fixed relay contacts and means coupling each of said meter terminals to a respective one of said reference conductors, such that receipt of successive pulses at said input terminals effects successive relay operations which alternatively charge said capacitor from the battery and provide a circuit for discharge of the capacitor through the meter to provide an indication of the engine speed.

4. In a speed indicating system for an engine under test which includes a plurality of cylinders and a distributor having a breaker point circuit, the combination of an electrical meter having a pair of terminals,
an electrical input circuit coupled between the meter and the breaker point circuit to apply across the meter a D-C voltage of given polarity and an amplitude which is a function of the rate of operation of the breaker point circuit, and
a variable shunting network, coupled in parallel with said meter, including a first switch having a movable contact coupled to one terminal of the electrical meter and having three fixed contacts, each fixed contact representing one circuit of three electrical circuits related to four-cylinder, six-cylinder and eight-cylinder engines, a second switch including at least three contact sets each having a movable contact and three fixed contacts, the three fixed contacts in each set representing the expanded scale, high scale and low scale meter presentations to be selected by actuation of the second switch, means respectively coupling each movable contact of the second switch to one of the fixed contacts in the first switch, three variable impedance circuits providing three ranges of shunting impedance values for selection by the second switch to provide different meter scale indications after the first switch provides cylinder selection, each variable impedance circuit having three input connections and a single output connection, means individually coupling the three input connections of each variable impedance circuit to a respective one of the fixed contacts in each of the three contact sets in the second switch, and means coupling the other terminals of the electrical meter to the output connection of each of the variable impedance circuits.

5. A speed indicating system as claimed in claim 4 in which the variable impedance circuit which provides expanded scale operation includes a battery connected in the proper sense to oppose said given polarity of said D-C voltage, and a potentiometer connected in series with said battery and adjustable to vary the extent of the bucking effect of the battery, to obtain a large deflection on the electrical meter for a small change in engine speed at a high operating speed.

6. A speed indicating system as claimed in claim 4 wherein said electrical input circuit includes a pair of input terminals for coupling to the breaker point circuit, a series circuit comprising an inductance, a first resistor and a second resistor all coupled in series between one of said input terminals and one of the meter terminals, a first Zener diode and a first capacitor coupled in parallel with each other and also coupled between the other of said input terminals and the common connection between said first and second resistors, a second Zener diode and a third resistor coupled in parallel with each other and also coupled between said other input terminal and said one meter terminal, a third switch having a movable switch contact and a plurality of fixed contacts, said movable switch contact disposed for actuation concomitantly with the three movable contacts of said second switch, a variable capacitor means coupled between said other input terminal and said fixed contacts of said third switch, a first diode coupled between said one meter terminal and said movable contact of said third switch, and a second diode coupled between the other of said meter terminals and the common connection between said first diode and said movable contact of said third switch, such that the capacitor placed in the circuit by the movable contact is charged by distributor pulses received at said electrical circuit input terminals and the accumulated charge is discharged through said second diode and the meter to provide an indication of the engine speed.

7. A speed indicating system as claimed in claim 4 in which said electrical input circuit comprises a pair of input terminals for coupling to said breaker point circuit, a relay including a winding coupled to said input terminals and further comprising a movable contact and a pair of fixed contacts for selective engagement by said movable contact, a battery coupled between a first reference conductor and one of said fixed relay contacts, a capacitor coupled between said one reference conductor and said movable relay contact, means electrically coupling second reference conductor to the other of said fixed relay contacts and means coupling each of said meter terminals to a respective one of said reference conductors, such that receipt of successive pulses at said input terminals effects successive relay operations which alternatively charge said capacitor from the battery and provide a circuit for discharge of the capacitor through the meter to provide an indication of the engine speed.

8. A speed indicating system for an engine under test which includes a plurality of cylinders and a distributor having a breaker point circuit, including an electrical meter having a pair of terminals, an electrical input circuit including a pair of input terminals for coupling to the breaker point circuit, a series circuit including an inductance, a first resistor and a second resistor all coupled between one of said input terminals and one of said meter terminals, a first Zener diode and a first capacitor coupled in parallel with each other and coupled between the other of said input terminals and the common connection between said first and second resistors, a second Zener diode and a third resistor coupled in parallel with each other and coupled between said other input terminal and said one meter terminal, a contact set including a movable contact and three fixed contacts, second, third and fourth capacitors each of which has one side coupled to said other input terminal and the other side coupled to a respective one of said fixed contacts, a first diode coupled between said one meter terminal and said movable contact, a series circuit including a fifth capacitor and a second diode coupled in parallel with said first diode, and means for coupling the other of said meter terminals to the common connection between said fifth capacitor and said second diode, and a variable shunting network, coupled in parallel with said meter, including a first switch having a movable contact coupled to said one terminal of the electrical meter and having three fixed contacts, each fixed contact representing one circuit of three electrical circuits related to four-cylinder, six-cylinder and eight-cylinder engines, a second switch including at least three contact sets each having a movable contact and three fixed contacts, the three fixed contacts in each set representing the expanded scale, high scale and low scale meter presentations to be selected by actuation of the second switch, means respectively coupling each movable contact of the second switch to a respective one of the fixed contacts in the first switch, a first variable impedance circuit including a battery and a first potentiometer coupled between said other meter terminal and one fixed contact in each of said three contact sets, a second variable impedance circuit including second, third and fourth potentiometers each coupled between said other meter terminal and a respective one of said contacts in each of said three contact sets, a third variable impedance circuit including fifth, sixth and seventh potentiometers each coupled between said other meter terminal and a respective one of said contacts in each of said three contact sets, said movable contact in the electrical input circuit being displaced concomitantly with the three movable contacts in said second switch to select one of said second, third and fourth capacitors in accordance with the meter scale indication and variable impedance circuit selected by actuation of said second switch.

References Cited

UNITED STATES PATENTS

| | | | |
|---|---|---|---|
| 2,513,668 | 7/1950 | Parker | 324—70 |
| 3,134,943 | 5/1964 | Evenson | 324—70 |
| 3,219,926 | 11/1965 | Dion | 324—70 |
| 3,275,932 | 9/1966 | Parmater | 324—70 |
| 3,283,247 | 11/1966 | Beller | 324—70 |

RUDOLPH V. ROLINEC, *Primary Examiner.*

M. J. LYNCH, *Assistant Examiner.*